United States Patent
Matsuzaki et al.

(10) Patent No.: US 7,818,779 B2
(45) Date of Patent: Oct. 19, 2010

(54) DIGITAL BROADCAST TRANSMISSION DEVICE AND METHOD THEREOF, AND DIGITAL BROADCAST RECEPTION DEVICE AND METHOD THEREOF

(75) Inventors: Kazuhiro Matsuzaki, Tokyo (JP); Yoshiaki Kato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1332 days.

(21) Appl. No.: 10/485,145

(22) PCT Filed: Mar. 26, 2003

(86) PCT No.: PCT/JP03/03724

§ 371 (c)(1), (2), (4) Date: Jan. 29, 2004

(87) PCT Pub. No.: WO03/084208

PCT Pub. Date: Oct. 9, 2003

(65) Prior Publication Data

US 2004/0226050 A1      Nov. 11, 2004

(30) Foreign Application Priority Data

Mar. 28, 2002    (JP) .............................. 2002-091485

(51) Int. Cl.
- H04N 7/16 (2006.01)
- G06K 5/04 (2006.01)
- G06F 11/30 (2006.01)
- G08C 25/00 (2006.01)
- H03M 13/00 (2006.01)
- H04L 1/00 (2006.01)

(52) U.S. Cl. ....................... 725/143; 725/147; 725/148; 714/699; 714/746

(58) Field of Classification Search .................. None
See application file for complete search history.

(56) References Cited

U.S. PATENT DOCUMENTS 5,936,925 A * 8/1999 Yoshio et al. ............ 369/30.18

(Continued)

FOREIGN PATENT DOCUMENTS

EP       1032205 A2 *  8/2000

(Continued)

OTHER PUBLICATIONS

Chu, et al. "Dynamic Multi-Path Communication for Video Traffic"; System Sciences, 1997, Proceedings of the Thirtieth Hawaii International Conference of Wailea, HI Jan. 7-10, 1997, Los Alamitos, CA, IEEE Comput. Soc. US LNKD-DOE: 10.1109/HICSS.1997.667449, vol. 1, Jan. 7, 1997; pp. 695-704, XP010272054; ISBN: 978-0-8186-7743-4.

(Continued)

*Primary Examiner*—Christopher Kelley
*Assistant Examiner*—Justin E Shepard
(74) *Attorney, Agent, or Firm*—Birch, Stewart, Kolasch & Birch, LLP.

(57) ABSTRACT

According to the present invention, in a content delivery managing section 16, transmission channels and transmission timing are allocated to contents layered according to content properties or respective contents constituting a program. In a content transmission section 10, on the basis of the transmission channels and transmission timing allocated in the content delivery managing section 16, coded bit sequences 101a to 101n of respective contents are multiplexed with timing information 102 such as decoding timing information, combination timing information, presentation timing information and reproduction start timing information for the contents generated in a timing information generating section 14 to generate transmission bit sequences 105a to 105n, and they are transmitted.

16 Claims, 10 Drawing Sheets

U.S. PATENT DOCUMENTS

| | | | |
|---|---|---|---|
| 6,011,590 A * | 1/2000 | Saukkonen | 375/240.05 |
| 6,826,233 B1 * | 11/2004 | Oosawa | 375/240.27 |
| 6,954,856 B1 * | 10/2005 | Kohashi et al. | 713/176 |
| 6,967,599 B2 * | 11/2005 | Choi et al. | 341/61 |
| 7,020,823 B2 * | 3/2006 | Bushmitch et al. | 714/752 |
| 7,106,757 B2 * | 9/2006 | Hong et al. | 370/469 |
| 7,209,632 B2 * | 4/2007 | Nono | 386/46 |
| 7,313,315 B2 * | 12/2007 | Morris et al. | 386/95 |
| 2002/0103919 A1 * | 8/2002 | Hannaway | 709/231 |
| 2002/0104084 A1 * | 8/2002 | Ching et al. | 725/36 |

FOREIGN PATENT DOCUMENTS

| | | |
|---|---|---|
| EP | 1 360 839 A2 | 11/2003 |
| JP | 62-189823 A | 8/1987 |
| JP | 10-174080 | 6/1998 |
| JP | 10-200455 | 7/1998 |
| JP | 10-285460 A | 10/1998 |
| JP | 11186975 | 7/1999 |
| JP | 2000-261389 | 9/2000 |
| JP | 2001-136456 A | 5/2001 |
| JP | 2001-136496 A | 5/2001 |
| JP | 2001-197048 A | 7/2001 |
| JP | 2001-320648 A | 11/2001 |

OTHER PUBLICATIONS

Reibman, et al. "Transmission of Multiple Description and Layered Video Over an EGPRS Wireless Network"; Image Processing, 2000. Proceedings. 2000 International Conference on Sep. 10-13, 2000, IEEE, Piscataway, NJ; vol. 2, Sep. 10, 2000; pp. 136-139, XP010529942; ISBN: 978-0-7803-6297-0.

Yeh, et al. "Multi-Path Channel Allocation for Multimedia Stream Services with Multi-Rate Supports"; Proceedings International Conferences on Info-Tech and Info-Net (ICII) 2001, Beijing LNKD; vol. 5, Oct. 29, 2001; pp. 247-252, XP010576995; ISBN: 978-0-7803-7010-4.

* cited by examiner

FIG. 3

| PROPERTY | DESCRIPTION |
| --- | --- |
| ID | NUMBER WHICH CAN UNIQUELY IDENTIFY CONTENT |
| TITLE | NAME OF THE CONTENT |
| IMPORTANCE LEVEL | REPRESENTING IMPORTANCE LEVEL BY NUMERICAL VALUE |
| PRIORITY | REPRESENTING PRIORITY AT THE TIME OF TRANSMISSION BY NUMERICAL VALUE |
| ERROR TOLERANCE LEVEL | REPRESENTING REQUIRED DEGREE OF ERROR TOLERANCE BY NUMERICAL VALUE |
| MEDIA CLASS | MEDIA TYPE, CODING SCHEME AND MULTIPLEXING SCHEME |
| FULL/PARTIAL DISTINCTION | FLAG REPRESENTING WHETHER THE CONTENT IS FULL CONTENT OR PARTIAL CONTENT<br><br>0: FULL CONTENT (FULL BIT STREAM; IT CAN BE DECODED AND PRESENTED INDEPENDENTLY)<br><br>1: REPRODUCIBLE PARTIAL CONTENT (IT FORMS PORTION OF THE BIT STREAM AND CAN BE DECODED AND PRESENTED INDEPENDENTLY; E.G., I PICTURE IN MPEG-2)<br><br>2: NON-REPRODUCIBLE PARTIAL CONTENT (IT FORMS PORTION OF THE CONTENT, AND CANNOT BE DECODED AND PRESENTED INDEPENDENTLY [IT WILL NOT BE MEANINGFUL CONTENT UNLESS IT IS COMBINED INTO FULL CONTENT; E.G., P AND B PICTURES IN MPEG-2]) |
| BIT RATE | REPRESENTING BIT RATE OF THE CONTENT |
| TIME LENGTH | TIME LENGTH OF THE CONTENT |
| TIME INFORMATION | DECODING TIMING INFORMATION, COMBINING TIMING INFORMATION, PRESENTING TIMING INFORMATION, REPRODUCTION STARTING TIMING INFORMATION ETC. (THEY CAN BE OMITTED IF THESE PIECES OF INFORMATION ARE MULTIPLEXED WITH THE CONTENT) |
| RELATED CONTENT ID | IDS OF RELATED CONTENTS (E.G., IDS OF CONTENTS CONSTITUTING THE SAME PROGRAM) |
| SUPPLEMENTARY CONTENT ID | IDS OF CONTENTS HAVING DATA SUPPLEMENTING THE CONTENT IF IT IS PARTIAL CONTENT |

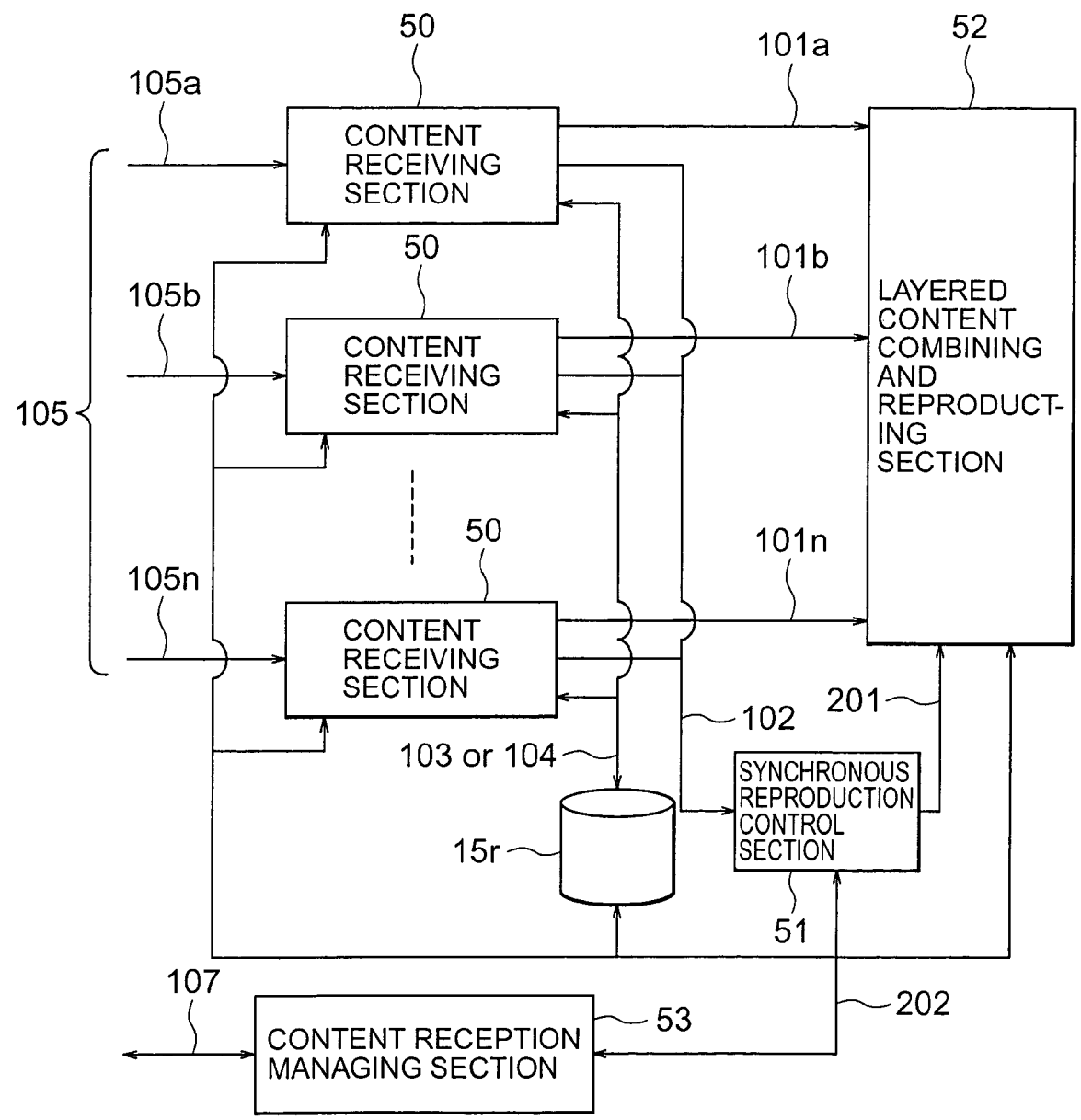

DIGITAL BROADCAST TRANSMISSION DEVICE AND METHOD THEREOF, AND DIGITAL BROADCAST RECEPTION DEVICE AND METHOD THEREOF

TECHNICAL FIELD

This invention relates to a digital broadcasting transmission apparatus and a method therefor, and a digital broadcasting reception apparatus and a method therefor, for providing a digital broadcasting service using broadcasting satellites, terrestrial waves, CATV networks, the Internet, etc., and more particularly to a digital broadcasting transmission apparatus and a method therefor, and a digital broadcasting reception apparatus and a method therefor, having capability of transmitting/receiving programs using auxiliary transmission channels in addition to capability of transmitting/receiving programs using ordinary transmission channels. This invention further relates to a digital broadcasting transmission apparatus and a method therefor, and a digital broadcasting reception apparatus and a method therefor, intended for a storage-type digital broadcasting reception apparatus having storage/reproduction capability.

BACKGROUND ART

FIG. 8 and FIG. 9 are processing block diagrams of a conventional digital broadcasting transmission apparatus and a method therefor, and a digital broadcasting reception apparatus and a method therefor, complying with, for example: Associations of Radio Industries and Businesses, "Receiver for BS Digital Broadcasting" Standard (ARIB STD-B21, Version 1.1), pp. 3-4, FIG. 3-1 and FIG. 3-2 (enacted on Mar. 29, 2000).

In FIG. 8, reference numeral 11 designates a multiplexing section; 12 a scrambling section; 13 a transmission processing section; and 14 a timing information generating section.

In FIG. 9, reference numeral 21 designates a reception processing section; 22 a descrambling section; 23 a demultiplexing section; 24 an information source decoding/reproducing section; and 25 a synchronization managing section.

Processing on the transmitting side in the conventional digital broadcasting transmission apparatus will now be described with reference to FIG. 8.

In the multiplexing section 11, coded bit sequences 101 of image, voice and other data are multiplexed to generate a multiplexed bit sequence 103. At this point, timing information 102 such as decode timing, combination timing and presentation timing for a coding unit of image or voice (for example, an image frame for image, and a voice processing frame for voice) is generated in the timing information generating section 14 and multiplexed together. In the scrambling section 12, the multiplexed bit sequence 103 is scrambled to generate a scrambled bit sequence 104. In the transmission processing section 13, the scrambled bit sequence 104 is subjected to processing such as FEC (forward error correction), energy dispersal, convolutional coding, construction of transmission frames, and modulation to generate a transmission bit sequence 105, which is delivered on a transmission path.

The conventional digital broadcasting reception apparatus will be described with reference to FIG. 9.

In the reception processing section 21, the transmission bit sequence 105 is received and subjected to processing such as demodulation, reconstruction of transmission frames, Viterbi decoding, energy reverse dispersal and error correction to reproduce the scrambled bit sequence 104. In the descrambling section 22, the scrambled bit sequence 104 is subjected to descrambling to reproduce the multiplexed bit sequence 103. In the demultiplexing section 23, the coded bit sequences 101 of image, voice and the like constituting a selected program, and the timing information 102 are separated from among programs multiplexed in the multiplexed bit sequence 103. In the synchronization managing section 25, the decode timing and presentation timing of a coding unit in each coded bit sequence are determined on the basis of the separated timing information 102, and are inputted as a reproduction control signal 106 to the information source decoding/reproducing section 24. In the information source decoding/reproducing section 24, individual coded bit sequences are decoded and synchronously reproduced according to the reproduction control signal 106.

In addition, FIG. 10 is a processing block diagram of a conventional digital broadcasting transmission apparatus and a digital broadcasting reception apparatus disclosed in, for example, JP 2001-136496 A.

In FIG. 10, reference numeral 31 designates a broadcasting station; 32 image data distributing means; 33 data distributing means; 34 a receiving equipment; 35 image data confirming means; 36 data calling means; 37 and 38 buffers; 39 synchronizing means; 40 image data displaying means; and 41 data processing means.

In the digital broadcasting transmission apparatus and the digital broadcasting reception apparatus disclosed in JP 2001-136496 A, the broadcasting station 31 distributes image data and data separately. In the receiving equipment 34, both of the data are synchronously reproduced on the basis of synchronization information (comprised of a name of data to be synchronized with the image, an application name, a data size, and a processing running time) which is sent with the image data. In addition, a domestic server is located between the broadcasting station 31 and the receiving equipment 34. The domestic server temporarily stores the image data and the data, and then synchronously reproduces both of the data based on synchronization information (comprised of a name of data to be synchronized with the image, an application name, a data size, and a processing running time).

However, the above processing was performed in the conventional digital broadcasting transmission apparatus and the digital broadcasting reception apparatus shown in FIG. 10. As a form of reproducing a content (i.e., program) on the receiving side, a transmission bit sequence sent from one transmission channel was received to synchronously reproduce image, voice and the like constituting the content.

In addition, in the digital broadcasting transmission apparatus and the digital broadcasting reception apparatus shown in FIG. 10, the broadcasting station 31 distributed image data and data separately, but distributed voice data on the same transmission channel of the image data, as in the conventional examples shown in FIG. 8 and FIG. 9. For intermittently distributed data, synchronous reproduction with image could be achieved in this manner. However, in the case of distributing continuously distributed voice data on a transmission channel different from that for image data, it is inconvenient to perform decoding/reproduction by referring to synchronization information carried on the transmission channel different from that for the voice data in view of real-time and continuous processing. It was therefore difficult to realize a multi-language broadcasting service which substitutes a voice portion distributed on a certain transmission channel for voice distributed on another transmission channel or for voice received and stored in advance, and reproduces it.

DISCLOSURE OF THE INVENTION

This invention has been made to eliminate the above problems. An object of the invention is to transmit a part of contents layered according to importance level, quality, and error tolerance level on different transmission channels, and on the receiving side, to receive the part of contents to achieve combined reproduction and synchronous reproduction.

Another object of the invention is to transmit in advance a part of contents layered according to content properties such as importance level, quality, and error tolerance on different transmission channels, and on the receiving side, to achieve combined reproduction and synchronous reproduction thereof.

Another object of the invention is to transmit, or to transmit in advance, a plurality of contents constituting one program on different transmission channels, and on the receiving side, to achieve synchronous reproduction thereof.

Another object of the invention is to achieve synchronous reproduction of contents being received in real time and stored contents.

In order to attain the above-mentioned objects, according to the present invention, a digital broadcasting transmission apparatus includes: timing information generating means for providing timing information indicating processing timing of received contents on a reception apparatus side; and content transmission means for transmitting respective contents and the timing information for the respective contents on a plurality of transmission channels, and is characterized in that the content transmission means allocates a transmission channel to each layer of contents layered according to content properties such as importance level, quality, and error tolerance, or allocates a transmission channel to each of a plurality of contents constituting one program, to provide transmission.

In particular, with the content transmission means, the digital broadcasting transmission apparatus is characterized in that a part of contents layered according to content properties such as importance level, quality, and error tolerance, or a part of a plurality of contents constituting one program is transmitted with the timing information generated in the timing information generating means, on different transmission channels, before a program broadcast or after a program broadcast.

In addition, the digital broadcasting transmission apparatus is characterized in that the timing information generating means generates, as the timing information, combination timing information indicating combination timing for processing units of contents divided into a plurality of objects or processing units of layered contents.

In addition, the digital broadcasting transmission apparatus is characterized in that the content transmission means allocates a transmission channel to each layer of contents layered according to content properties such as importance level, quality, and error tolerance, or to each of a plurality of contents constituting one program, based on a degree of congestion of the transmission channels, to provide transmission.

In addition, the digital broadcasting transmission apparatus is characterized in that when the content transmission means allocates a transmission channel to each layer of contents layered according to content properties such as importance level, quality, and error tolerance, or to each of a plurality of contents constituting one program, to provide transmission, the content transmission means compensates for a difference of transmission delay between respective transmission channels to provide transmission.

In addition, the digital broadcasting transmission apparatus is characterized in that the content transmission means compensates for a difference of transmission delay between respective transmission channels based on transmission delay information notified from a receiving side, to provide transmission Further, a digital broadcasting transmission method is characterized by including: transmitting a part of contents layered according to content properties such as importance level, quality, and error tolerance or a part of a plurality of contents constituting one program, with timing information indicating processing timing at which received contents are processed on a receiving side, before a program broadcast or after a program broadcast.

Further, a digital broadcasting reception apparatus is characterized by including: content receiving means for receiving contents transmitted on one or more transmission channels and timing information indicating processing timing at which received contents are processed; content reproducing means for reproducing the received contents; and synchronous reproduction control means for providing control to reproduce contents layered according to content properties such as importance level, quality, and error tolerance, or a plurality of contents constituting one program while establishing synchronization between the contents by referring to the timing information.

In addition, the digital broadcasting reception apparatus further includes storage means for storing the received contents, and is characterized in that when the synchronous reproduction control means provides control to reproduce contents being received on one or more transmission channels while establishing synchronization between the contents by referring to the timing information, the synchronous reproduction control means provides control to detect contents related to the contents being received among the contents stored in the storage means and to reproduce the contents while establishing synchronization between the contents being received and corresponding stored contents by referring to the timing information.

In addition, the digital broadcasting reception apparatus is characterized by further including, at a stage previous to the content reproducing means, content combining means for combining the layered contents.

In addition, the digital broadcasting reception apparatus is characterized by further including content reception managing means for requesting transmission of contents and information related to the contents.

In addition, the digital broadcasting reception apparatus is characterized in that when the content receiving means receives the timing information transmitted via a plurality of transmission channels, the content reception managing means detects a transmission delay time of each transmission channel or a difference of transmission delay times between the transmission channels and notifies a transmitting side as transmission delay information.

Furthermore, a digital broadcasting reception method is characterized by including: providing control to reproduce contents layered according to content properties such as importance level, quality, and error tolerance, or a plurality of contents constituting one program while establishing synchronization between the contents by referring to the timing information, when contents transmitted on one or more transmission channels and timing information indicating processing timing at which received contents are processed are received, and the received contents are reproduced.

BRIEF DESCRIPTION OF THE DRAWINGS

FIG. 3 is a table of content properties stored together as additional information when the content is stored in an embodiment of this invention.

FIG. 4 is a block diagram of a digital broadcasting reception apparatus illustrating an embodiment of this invention.

BEST MODE FOR CARRYING OUT THE INVENTION

Embodiments of a digital broadcasting transmission apparatus and a method therefor, and a digital broadcasting reception apparatus and a method therefor according to this invention will now be described, respectively.

[Structure and Operation on the Side of the Digital Broadcasting Transmission Apparatus]

First the structure and operation on the side of the digital broadcasting transmission apparatus will be described.

Figure 1:
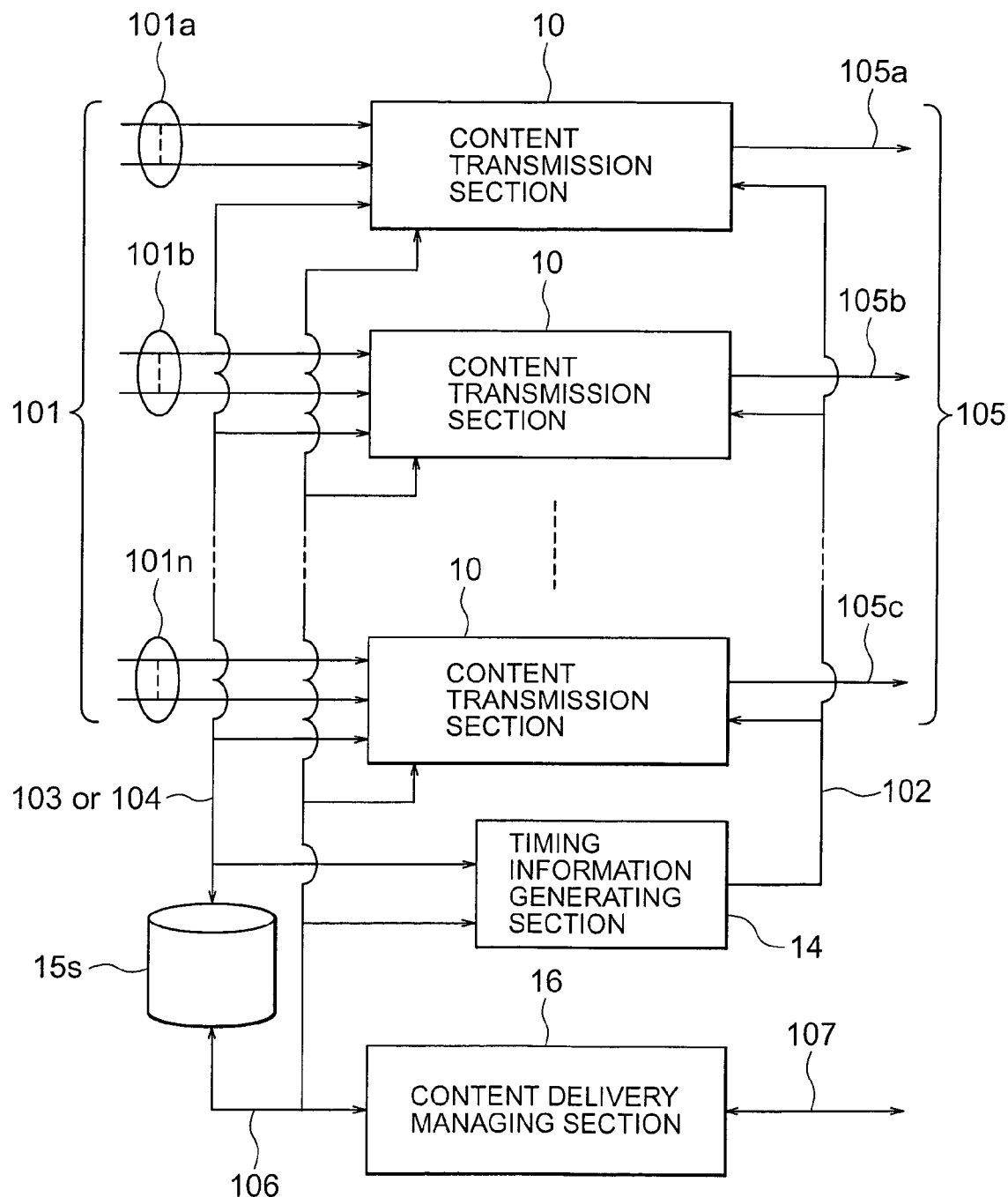
FIG. 1 is a block diagram of a digital broadcasting transmission apparatus illustrating an embodiment of this invention.

FIG. 1 is a block diagram of a digital broadcasting transmission apparatus illustrating an embodiment according to this invention. In FIG. 1, reference numeral 10 designates a content transmission section provided for each transmission channel, operable as content transmission means, for transmitting contents and various timing information. Reference numeral 14 designates a timing information generating section operable as timing information generating means. Reference numeral 16 designates a content delivery managing section operable as content transmission means for allocating a transmission channel to each layer of contents layered according to content properties such as importance level, quality, and error tolerance or for allocating a transmission channel to each of a plurality of contents constituting one program according to a degree of congestion of the transmission channels, and for determining whether the transmission should be performed during a program broadcast or before or after the program broadcast. Reference numeral 15s designates a storage section for storing contents.

Figure 2:
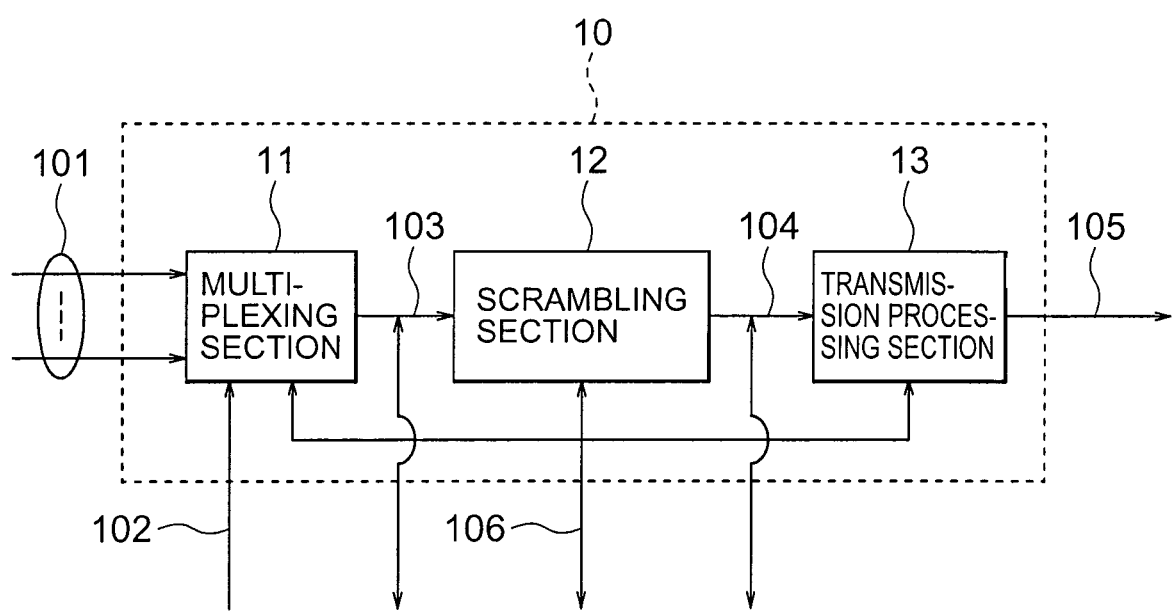
FIG. 2 is a block diagram of each content transmission section 10 of the digital broadcasting transmission apparatus illustrating an embodiment of this invention.

FIG. 2 is a block diagram of each content transmission section 10 of the digital broadcasting transmission apparatus shown in FIG. 1. In FIG. 2, reference numeral 11 designates a multiplexing section for multiplexing coded bit sequences 101; 12 a scrambling section for scrambling a multiplexed bit sequence 103 generated in the multiplexing section 11; and 13 a transmission processing section for applying processing such as FEC (forward error correction), energy dispersal, convolutional coding, and modulation to a scrambled bit sequence 104 generated in the scrambling section 12 to generate a transmission bit sequence 105 and for delivering it on each transmission channel.

Next the operation will be described.

In this digital broadcasting transmission apparatus, the content transmission section 10 is provided for each transmission channel. Respective transmission channels are allocated to coded bit sequences 101a to 101in by layering the transmission channels according to content properties such as importance level, quality, and error tolerance. Alternatively, the coded bit sequences 101a to 101n are formed by allocating each transmission channel to each of a plurality of contents constituting one program. In each content transmission section 10, as shown in FIG. 2, these coded bit sequences 101a to 101n are multiplexed in the multiplexing section 11 to generate the multiplexed bit sequence 103, which is scrambled in the scrambling section 12. The transmission processing section 13 applies processing such as FEC, energy dispersal, convolutional coding, and modulation to generate the transmission bit sequence 105 and delivers it on each transmission channel. The coded bit sequences 101 layered according to content properties such as importance level, quality, and error tolerance and divided into respective transmission channels for delivery are coded, for example, according to the MPEG-4 standard.

On that occasion, in each content transmission section 10 of this digital broadcasting transmission apparatus provided for each transmission channel, each multiplexing section 11 multiplexes timing information 102 with the incoming coded bit sequences 101, where the timing information 102 includes decoding timing information, combination timing information, presentation timing information, and reproduction start timing information for the contents, and clock information providing a time scale for each of the timing information generated in the timing information generating section 14.

In addition, the multiplexing section 11 in each content transmission section 10 further multiplexes with the incoming coded bit sequences 101, if necessary, a part or all of information such as content property information shown in FIG. 3 described below, line quality information, transmission delay information, and line usage condition, provided via a content delivery control signal 106 from the content delivery managing section 16 etc.

FIG. 3 shows an example of content property information.

The content property information includes: "ID" containing a number which can uniquely identify a content; "title" indicating the name of the content; "importance level" representing an importance level by a numerical value; and "priority" representing a priority at the time of transmission by a numerical value. The content property information also includes: "error tolerance level" representing a required degree of error tolerance by a numerical value; "media class" indicating a media type, coding scheme and multiplexing scheme; and "full/partial distinction" containing a flag representing whether the content is a full content or a partial content. For example, if the flag of "full/partial distinction" is "0", it indicates a full content, that is, a full bit stream which can be decoded and presented independently. If the flag is "1", it indicates a reproducible partial content, that is, for example, I picture in MPEG-2, which forms a portion of the bit stream and can be decoded and presented independently. If the flag is "2", it indicates a non-reproducible partial content, that is, for example, P and B pictures in MPEG-2, which form a portion of the content, cannot be decoded and presented independently, and will not be a meaningful content unless it is combined with a full content.

The content property information also includes: "bit rate" representing a bit rate of the content; "time length" indicating temporal length of the content; "time information" (timing information) which is timing information 102 indicating various processing timing such as decoding time, combining time, presenting time, and reproduction starting time; "related content ID" indicating IDs of contents, for example, constituting the same program; and "supplementary content ID" indicating IDs of contents having data supplementing the content if the content is a partial content. Note that the "time information" can be omitted if it is already multiplexed with the coded bit sequences 101 in the multiplexing section 11.

Now, the processing timings for the multiplexing in the multiplexing section 11, the scrambling in the scrambling section 12, and the transmission processing in the transmission processing section 13 in each content transmission section 10 are based on the content delivery control signal 106 from the content delivery managing section 16.

Therefore, the scrambling section 12 can read out and scramble, on the basis of the content delivery control signal 106 from the content delivery managing section 16, the multiplexed bit sequence 103 which has been stored in advance in the storage section 15s on the basis of the content delivery control signal 106 from the content delivery managing section 16. The transmission processing section 13 can then apply transmission processing to the resulting output on the basis of the content delivery control signal 106 from the content delivery managing section 16 to generate a transmission bit sequence 105, and deliver it on the transmission channel.

Further, the transmission processing section 13 can also read out a scrambled bit sequence 104 stored in the storage section 15s based on the content delivery control signal 106 from the content delivery managing section 16, apply transmission processing to generate a transmission bit sequence 105, and deliver it on the transmission channel.

In addition, when the content stored in the storage section 15s in the form of the multiplexed bit sequence 103 and scrambled bit sequence 104 is read out and transmitted as described above, the multiplexing section 11 directs the scrambling section 12 and the transmission processing section 13 to replace the timing information multiplexed with the multiplexed bit sequence 103 on the basis of the timing information 102 generated in the timing information generating section 14.

Next a specific example of the content delivery management in the content delivery managing section 16 will be described.

The content delivery managing section 16 gives notice of the timing of processing of the timing information generating section 14 via the content delivery control signal 106 as well as of processing in each content transmission section 10. The content delivery managing section 16 also specifies contents to be transmitted on each transmission channel, that is, contents to be processed in each content transmission section 10, based on the content property information shown in FIG. 3 such as importance level, priority, error tolerance level, and identification information indicating whether the contents belong to the same program, and on the information such as line quality information, transmission delay information, and line usage condition provided via a request/notification signal 107 from the receiving side or the network provider side. For example, when coding is performed for each object as with MPEG-4, the contents to be transmitted on each transmission channel can be specified so that a more important object such as a person may be transmitted on a transmission channel with a minimum transmission delay and a stable line condition, while a less important object such as a background may be transmitted on a transmission channel with more transmission delay and a poor line condition. This enables more important objects to be broadcasted quickly in a stable condition with a minimum transmission delay even under a limited line usage condition.

In addition, the content delivery managing section 16 may determine contents to be transmitted during the program broadcast and contents to be transmitted before and after the program broadcast, and notify each section of the determination result via the content delivery control signal 106, based on the content property information shown in FIG. 3 such as importance level, priority, error tolerance level, and identification information indicating whether the contents belong to the same program, and on the information such as line quality information, transmission delay information, and line usage condition provided via a request/notification signal 107 from the receiving side or the network provider side. For example, a program composed of a less important content is controlled so that it is not transmitted on an ordinary broadcast channel, but on an Internet line or another broadcast channel prepared as a transmission subchannel. This enables the broadcasting even when the transmission condition or the like of the broadcasting channel deteriorates since transmission subchannels are utilized as appropriate depending on the transmission condition or the like of the broadcasting channel.

Further, the content delivery managing section 16 controls transmission so as to compensate for the difference of transmission delay times between respective transmission channels when an image, its associated main voice, and one or more subvoices are transmitted on separate transmission channels. That is, in this digital broadcasting transmission apparatus, as shown in FIG. 1, the content delivery managing section 16 is notified of the transmission delay information of the transmission channel via the request/notification signal 107 from an apparatus on the receiving side (not shown) or the network provider (not shown). The content delivery managing section 16 receives the request/notification signal 107, detects and compensates for the difference of transmission delay times between respective transmission channels to transmit an image, its associated main voice, and one or more subvoices on different transmission channels, respectively. This allows the receiving side to reduce buffer capacity prepared for the decoding and synchronous reproduction of the image, main voice, and subvoices. In addition, even when the contents transmitted on different transmission channels are separately decoded and reproduced in a simple receiver which does not support synchronous reproduction capability, each content can be almost synchronously reproduced on the receiver side because the digital broadcasting transmission apparatus, in advance, compensates for the difference of transmission delay times between respective transmission channels and transmits the contents.

Further, regarding contents of a program transmitted before and after the program broadcast, the content delivery managing section 16 may determine the time of pre-broadcast transmission or post-broadcast transmission via a user input, or automatically, by referring to a predetermined program delivery schedule, etc. Automatic determination of the time of pre-broadcast transmission or post-broadcast transmission is achieved by, for example, detecting a time zone having available transmission channels by referring to the program delivery schedule. As an example of pre-broadcast transmission, if bad weather is expected using information of a weather forecast, for example, a part of the contents of the program may be transmitted before a broadcast of the program, and controlled so that the receiving side may store it in advance. Moreover, if the weather suddenly becomes bad, for example, more important portions of the contents of the program can be transmitted with its error tolerance enhanced using a transmission channel having better transmission environment, etc. The contents of relatively low importance or urgency which cannot be transmitted because of the increase of the transmission bit rate due to the enhancement of error tolerance can be controlled so as to be transmitted subsequently after lapse of a certain period of time.

Furthermore, when a content delivery time is specified via the request/notification signal 107 from the apparatus on the receiving side or the provider side, the content delivery managing section 16 may, of course, using the content delivery control signal 106, notify the storage section 15s, the content transmission section 10, and the timing information generating section 14 of transmitting the content according to the specified time, so that each section is controlled to transmit the content according to the specified time.

In addition, in response to a request from the receiving side, the content delivery managing section 16 may notify the receiving side of a program broadcasting schedule or a list of contents which can be distributed on demand using the request/notification signal 107.

Further, the receiving side may be notified of a part or all of the content property information shown as an example in FIG. 3 such as importance level, priority, error tolerance level, and identification information indicating whether the contents belong to the same program, and the information such as line quality information, transmission delay information and line usage condition, as appropriate via the request/notification signal 107, instead of the multiplexing section 11 transmitting the information by multiplexing the information with the coded bit sequences 101.

Next a specific example of generating the timing information in the timing information generating section 14 will be described.

The timing information generating section 14 detects boundaries of units (for example, image frames for image, and voice processing frames for voice) and a coding mode for each unit (for example, predictive coding mode such as unidirectional prediction/bidirectional prediction/intraframe prediction) for a set of content data processed in the content transmission section 10. On the basis of the detected coding mode for each unit and the content delivery control signal 106 provided from the content delivery managing section 16, the timing information generating section 14 generates, for each unit, decoding timing information indicating the decoding timing in the reception apparatus, and presentation (reproduction) timing information indicating the presentation (reproduction) timing of each decoded unit. For example, when the bidirectional predictive coding mode is used as the coding mode, the decoding sequential order is different from the presentation (reproduction) sequential order. Therefore, while on the transmitting apparatus side the units are interchanged before coding, on the reception apparatus side, each unit is decoded on the basis of the decoding timing information, and after the decoding, the units are interchanged to present each unit according to the presentation timing information.

Further, when contents such as layered image contents are transmitted, the timing information generating section 14 generates, in addition to the decoding timing information and the presentation timing information, combination timing information indicating the timing of combining contents of respective layers on the basis of the content delivery control signal 106, and multiplexes these information with the coded bit sequences 101 in each content transmission section 10. In this way, on the side of this digital broadcasting transmission apparatus, even when important contents and less important contents constituting one program are layered and transmitted on different transmission channels, the time of combining the important contents and less important contents can be indicated by means of the MPEG-4 coding etc. Therefore, on the reception apparatus side, the important contents and less important contents can be combined using the combination timing information.

Further, if necessary, the timing information generating section 14 may also generate reproduction start timing information of the contents on the basis of the content delivery control signal 106, and multiplex the reproduction start timing information with the coded bit sequences 101 in each content transmission section 10. In this way, notice of the reproduction starting time of each content is given via the reproduction start timing information. Therefore, the reception apparatus can substantially establish reproduction synchronization between the contents simply by reproducing each content from the time indicated by the reproduction start timing information. For example, it may be difficult for a simple reception apparatus such as a mobile receiving terminal to provide synchronous reproduction based on the decoding timing information, the combination timing information and the presentation timing information due to its restricted performance. However, if the reproduction start timing information is transmitted, the simple reception apparatus can substantially establish reproduction synchronization between the contents by reproducing each content according to the reproduction starting time which is given via the reproduction start timing information.

[Structure and Operation on the Side of the Digital Broadcasting Reception Apparatus]

Next the structure and operation on the side of the digital broadcasting reception apparatus will be described.

FIG. 4 is a block diagram of a digital broadcasting reception apparatus illustrating an embodiment according to this invention. In FIG. 4, reference numeral 50 designates a content receiving section operable as content receiving means for receiving contents and various timing information; 51 a synchronous reproduction control section operable as synchronous reproduction control means, for controlling a reproduction start timing of contents; 52 a layered content combining and reproducing section operable as content reproducing means and content combining means; 53 a content reception managing section operable as synchronous reproduction control means for controlling processing timings of respective sections and for exchanging a request/notification signal 107 with the digital broadcasting transmission apparatus; and 15r a storage section for storing contents.

Figure 5:
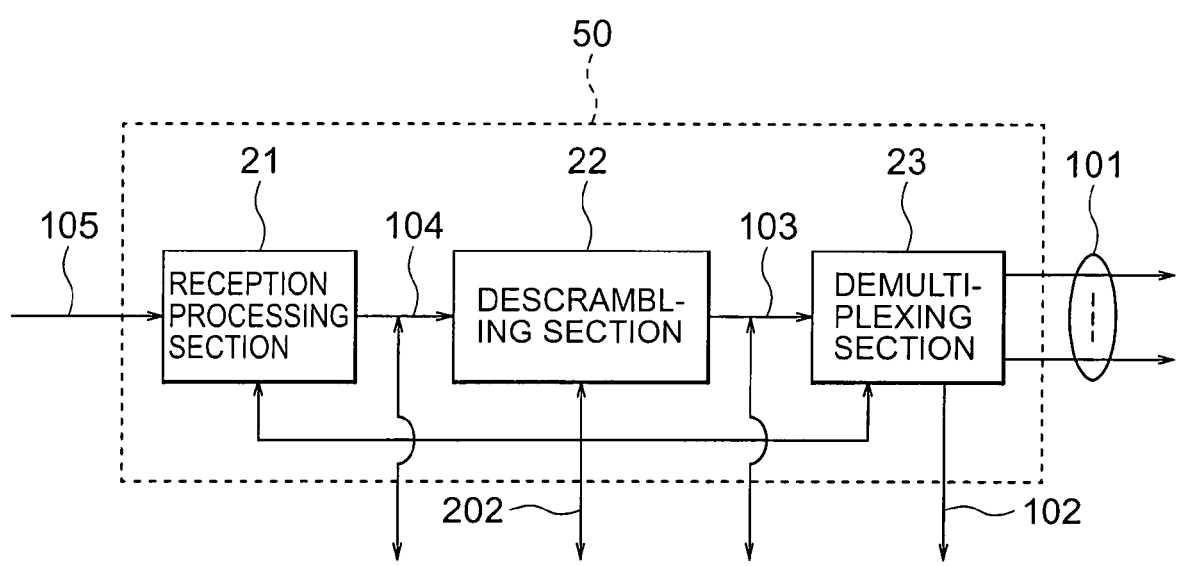
FIG. 5 is a block diagram of a content receiving section 50 of the digital broadcasting reception apparatus illustrating an embodiment of this invention.

FIG. 5 is a block diagram of the content receiving section 50 of the digital broadcasting reception apparatus shown in FIG. 1. In FIG. 5, reference numeral 21 designates a reception processing section for applying processing such as demodulation, Viterbi decoding, energy reverse dispersal, and error correction to a received transmission bit sequence 105 to reproduce a scrambled bit sequence 104; 22 a descrambling section for descrambling the scrambled bit sequence 104 to reproduce a multiplexed bit sequence 103; and 23 a demultiplexing section for demultiplexing the multiplexed bit sequence 103 to reproduce individual coded bit sequences.

Figure 6:
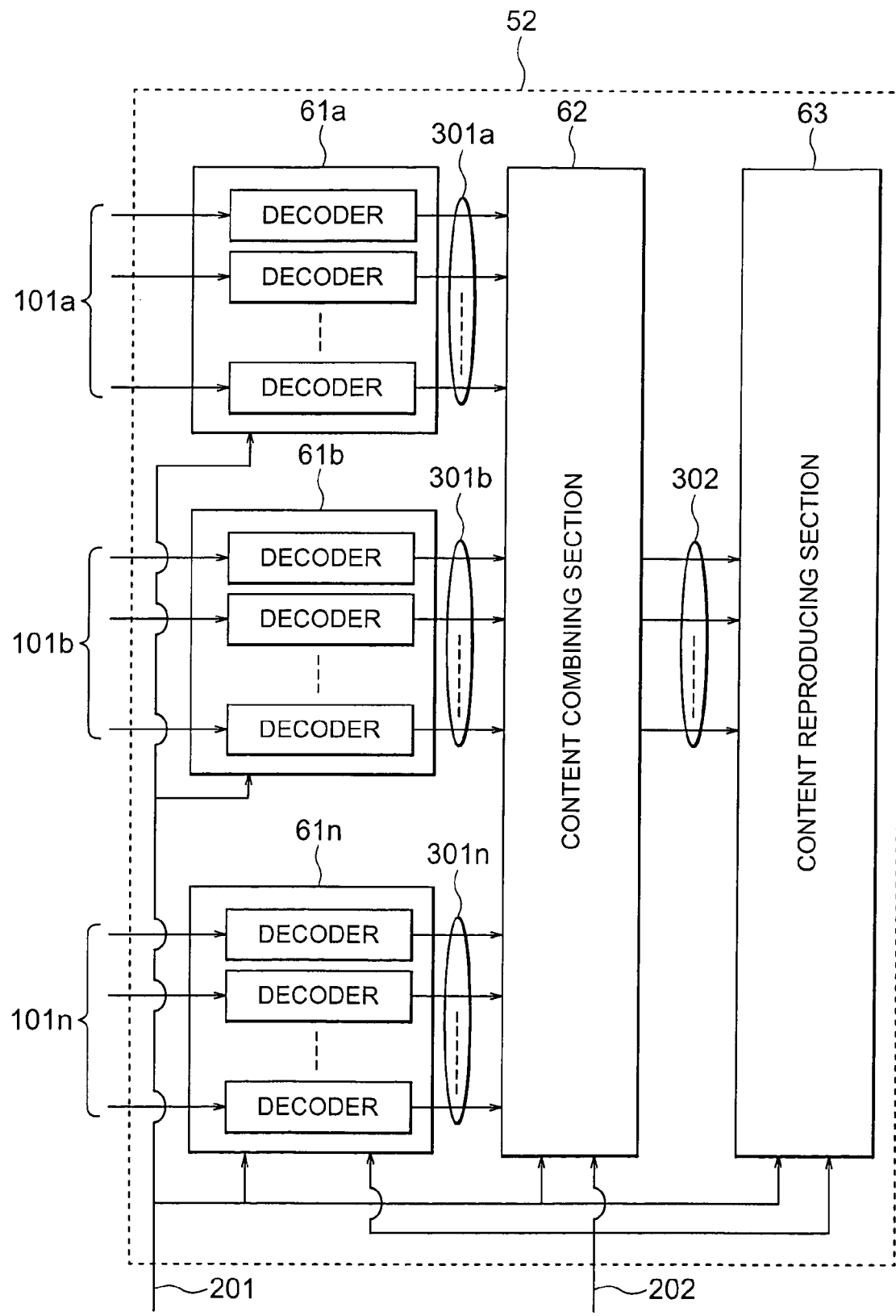
FIG. 6 is a block diagram of a layered content combining and reproducing section 52 of the digital broadcasting reception apparatus illustrating an embodiment of this invention.

FIG. 6 is a block diagram of the layered content combining and reproducing section 52 of the digital broadcasting reception apparatus shown in FIG. 1. In FIG. 6, reference numerals 61a, 61b, . . . , 61n designate decoder sections, each being provided for each transmission channel, for decoding coded bit sequences 101a, 101b, . . . , and 101n based on the decoding timing information of which the synchronous reproduction control section 51 notifies via a reproduction control signal 201; 62 a content combining section for combining decoded contents on the basis of the combination timing information of which the synchronous reproduction control section 51 notifies via the reproduction control signal 201; and 63 a content reproducing section for reproducing contents based on the presentation timing information notified of via the reproduction control signal 201. Here, each of the decoder sections 61a, 61b, . . . , 61n provides a plurality of decoders in order to handle the case where a plurality of contents are transmitted on one transmission channel. However, if it is determined that only one content is to be transmitted on one transmission channel, one decoder alone may be provided for each, of course.

Next the operation will be described.

In this digital broadcasting reception apparatus, each reception processing section 21, as shown in FIG. 5, in the content receiving section 50 provided for each transmission channel, receives a selected transmission bit sequence 105 from among the transmission bit sequences 105 layered according to content properties such as importance level, quality, and error tolerance transmitted using a plurality of transmission channels, and among the transmission bit sequences 105 associated with a plurality of contents constituting one program transmitted using a plurality of transmission channels. The reception is made based on the content property information (see FIG. 3) of which, for example, the digital broadcasting transmission apparatus of Embodiment 1 shown in FIG. 1 notifies via a content reception control signal 202. The reception processing section 21 then applies reception processing such as demodulation, Viterbi decoding, energy reverse dispersal, and error correction for each transmission channel to each of the received transmission bit sequences 105a, 105b, . . . , 105n to reproduce a scrambled bit sequence 104. Each of the scrambled sequences is then descrambled in the descrambling section 22, demultiplexed in the demultiplexing section 23, and outputted as coded bit sequences 101a, 101b, . . . , and 101n, respectively, to the layered content combining and reproducing section 52.

Further, if the transmission bit sequence 105 contains the decoding timing information, presentation timing information, combination timing information, or reproduction start timing information for the contents multiplexed on the transmitting side, the content receiving section 50 demultiplexes such information in the demultiplexing section 23 or the like to reproduce the information. The reproduced decoding timing information, combination timing information, presentation timing information, or reproduction start timing information for the contents are outputted as the timing information 102 to the synchronous reproduction control section 51.

Further, a part or all of the content property information assigned for each content on the transmitting side such as importance level, priority, error tolerance level, and identification information indicating whether the content belongs to the same program, and the information such as line quality information, transmission delay information, and line usage condition, is demultiplexed in the demultiplex processing in the demultiplexing section 23 as shown in FIG. 5, and outputted as a content reception control signal 202 to the content reception managing section 53.

On the basis of that content reception control signal 202, the content reception managing section 53 outputs the content reception control signal 202 to each content receiving section 50, the storage section 15r, the synchronous reproduction control section 51, and the layered content combining and reproducing section 52 to control the operation or processing of each of these sections.

According to the content reception control signal 202 from the content reception managing section 53, the storage section 15r temporarily stores a part or all of the received contents in the form of the multiplexed bit sequences 103 or scrambled bit sequences 104. The storage section 15r can also receive and store contents transmitted before and after the program broadcast, or contents which is requested by the receiver side for distribution from the transmitter side using a request/notification signal 107.

Here, contents stored in the form of the multiplexed bit sequences 103 are reproduced via the demultiplexing section 23 and the layered content combining and reproducing section 52. Further, contents stored in the form of the scrambled bit sequences 104 are reproduced via the descrambling section 22, the demultiplexing section 23, and the layered content combining and reproducing section 52.

In addition, when contents are stored in the storage section 15r, the content property information generated on the transmitter side to be transmitted therefrom as shown in FIG. 3 is stored along with the contents, and referred to at the time of reproducing the contents.

The synchronous reproduction control section 51 determines the decoding time, the combining time, the presenting time, and the reproduction starting time of the coded bit sequences 105 based on the demultiplexed timing information 102, and outputs a reproduction control signal 201 to the layered content combining and reproducing section 52.

On the basis of the reproduction control signal 201 from the synchronous reproduction control section 51, the layered content combining and reproducing section 52 decodes the coded bit sequences layered according to content properties such as importance level, quality, and error tolerance, and the coded bit sequences of a plurality of contents constituting one program, based on the decoding timing information or the presentation timing information indicated by the timing information 102. The layered content combining and reproducing section 52 then combines layered contents based on the combination timing information indicated by the timing information 102, and reproduces the decoded image, data, or voice via a monitor or a speaker according to the reproduction start timing information indicated by the timing information 102. Here, if this digital broadcasting reception apparatus is a simple receiver which does not support synchronous reproduction capability or layered content combination capability, the decoding and reproduction of contents incoming on each transmission channel is started according to the decoding timing information, the presentation timing information, and the reproduction start timing information, without using the combination timing information, thereby synchronization between the image content and the voice content in the basic layer is approximately established, and these contents are reproduced.

Here, the synchronous reproduction control section 51 combines and reproduces the coded bit sequences layered according to content properties such as importance level, quality, and error tolerance, and the coded bit sequences of a plurality of contents constituting one program according to the content reception control signal 202 from the content reception managing section 53 containing a part or all of the content property information and the information such as line quality information, transmission delay information, and line usage condition. The modes of reproduction in this situation are divided into the following three cases, each of which will be described in turn:

(1) The transmission bit sequences received on respective transmission channels are directly combined and reproduced without being temporarily stored;

(2) The transmission bit sequences received on recpective transmission channels and the temporarily stored transmission bit sequences are combined and reproduced; and (3) The transmission bit sequences received on respective transmission channels are combined and reproduced after being temporarily stored.

First, the mode (1) of directly combining and reproducing the transmission bit sequences received on respective transmission channels without being temporarily stored will be described. In this mode of reproduction, each of the transmission bit sequences 105*a*, 105*b*, . . . , and 105*n* transmitted on respective transmission channels is processed in parallel in the content receiving section 50 prepared for each transmission channel to reproduce each of the coded bit sequences 101*a*, 101*b*, . . . , and 10*n*. Then, the coded bit sequences are decoded, combined, and reproduced in the layered content combining and reproducing section 52 on the basis of the reproduction control signal 201 from the synchronous reproduction control section 51 based on the timing information 102. In the case of a simple reception apparatus without synchronous reproduction capability, pseudo synchronous reproduction is performed solely from the start point of the contents by referring to the decoding timing information, the presentation timing information, and the reproduction start timing information included in the timing information 102, without using the combination timing information.

Next the mode (2) of combining and reproducing the transmission bit sequences received on respective transmission channels and the transmission bit sequences temporarily stored in the storage section 15*r* will be described. In this mode of reproduction, when a user selects the reproduction operation, for example, the content receiving sections 50 read out the related contents from the storage section 15*r* in accordance with the reception status of the contents, and process these contents in parallel to reproduce the coded bit sequences 101*a*, 101*b*, . . . , and 101*n*, respectively. Then, the coded bit sequences are decoded, combined, and synchronously reproduced in the layered content combining and reproducing section 52 on the basis of the reproduction control signal 201 from the synchronous reproduction control section 51 based on the timing information 102. Here, the content property information such as the related content ID (see FIG. 3) is used to identify interrelated contents. As described above, the content property information for the contents being received is transmitted by being multiplexed and transmitted with the contents, or is transmitted as a request/notification signal 107 on another transmission channel. Note that the content property information for the stored contents is stored along with the contents in the storage section 15*r*.

Figure 7:
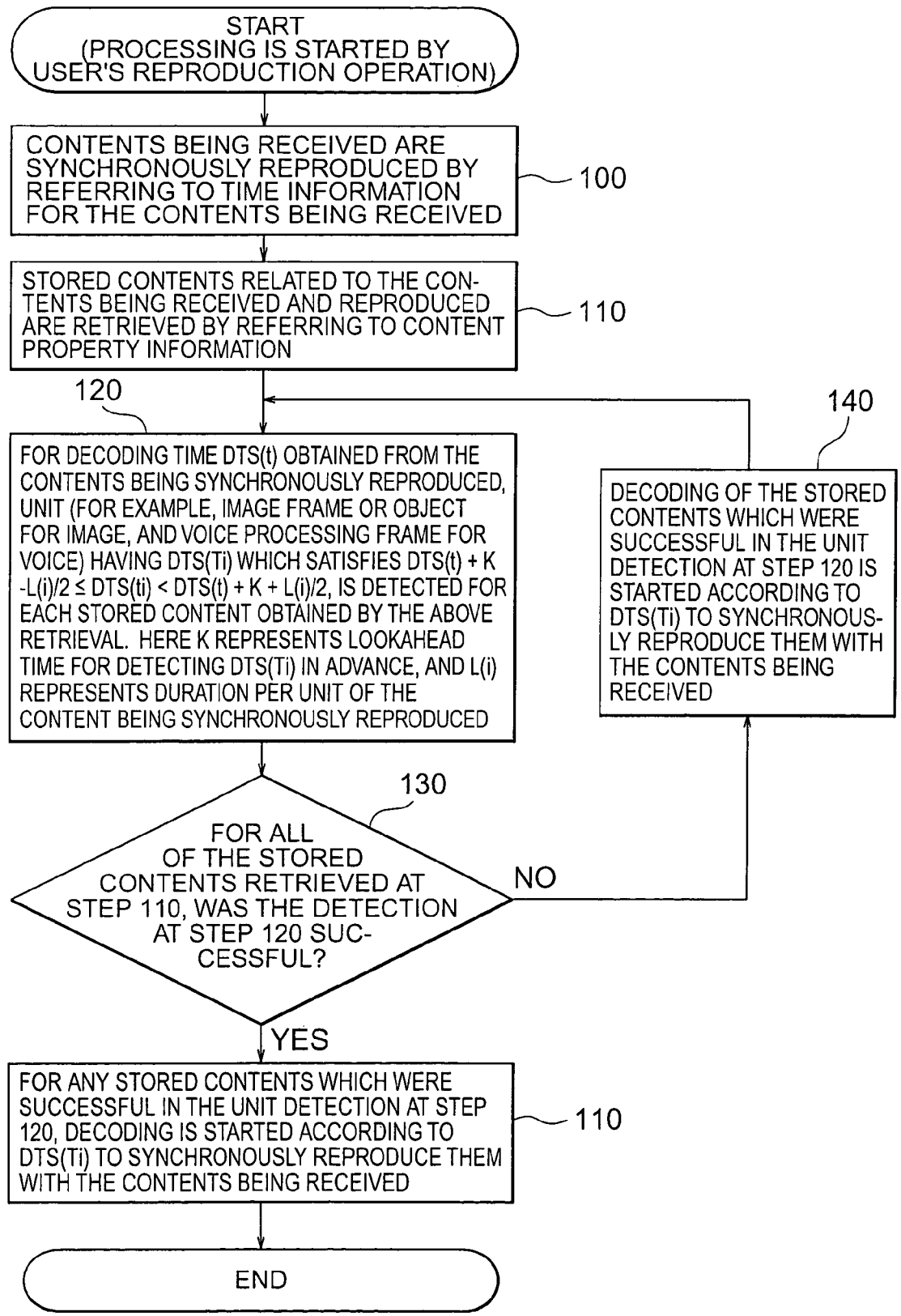
FIG. 7 is a flow chart illustrating a processing procedure when contents being received from transmission channels and stored contents are synchronously reproduced in the digital broadcasting reception apparatus illustrating an embodiment of this invention.
Figure 8:
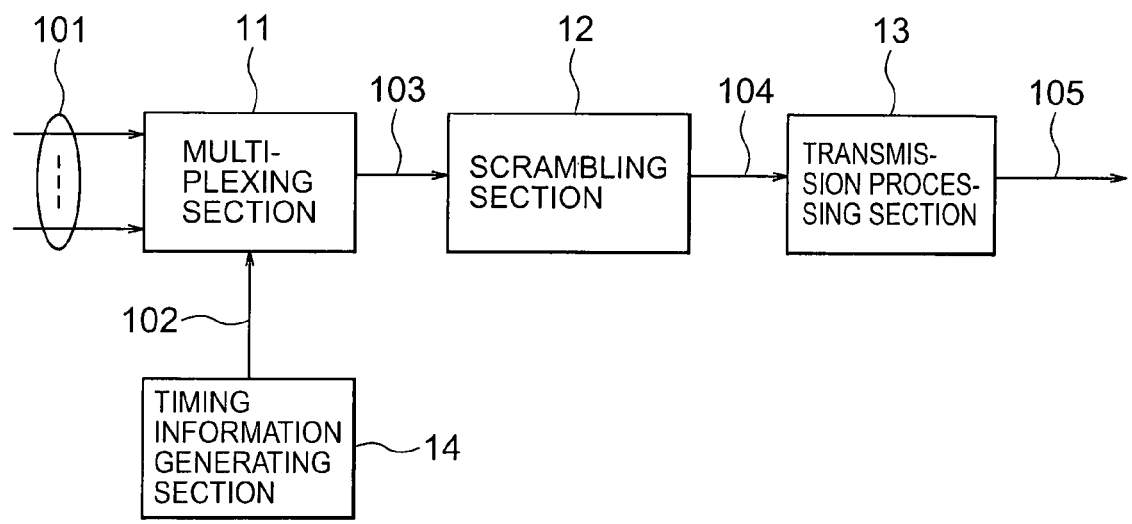
FIG. 8 is a block diagram of a conventional digital broadcasting transmission apparatus.
Figure 9:
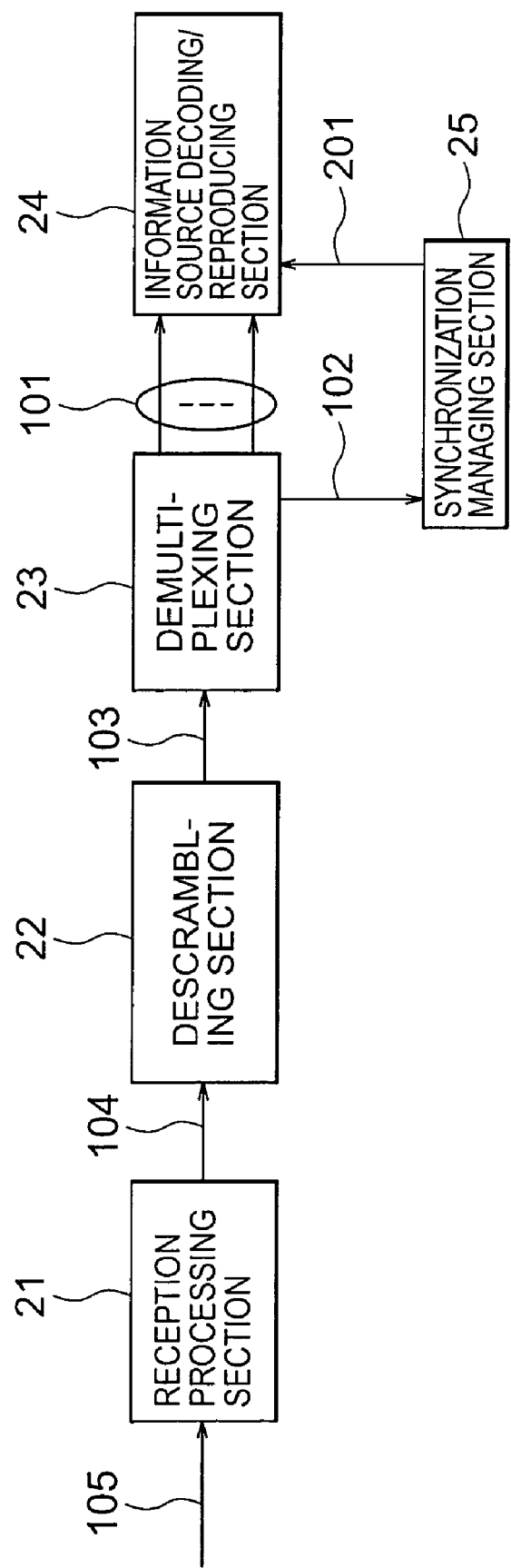
FIG. 9 is a block diagram of a conventional digital broadcasting reception apparatus.
Figure 10:
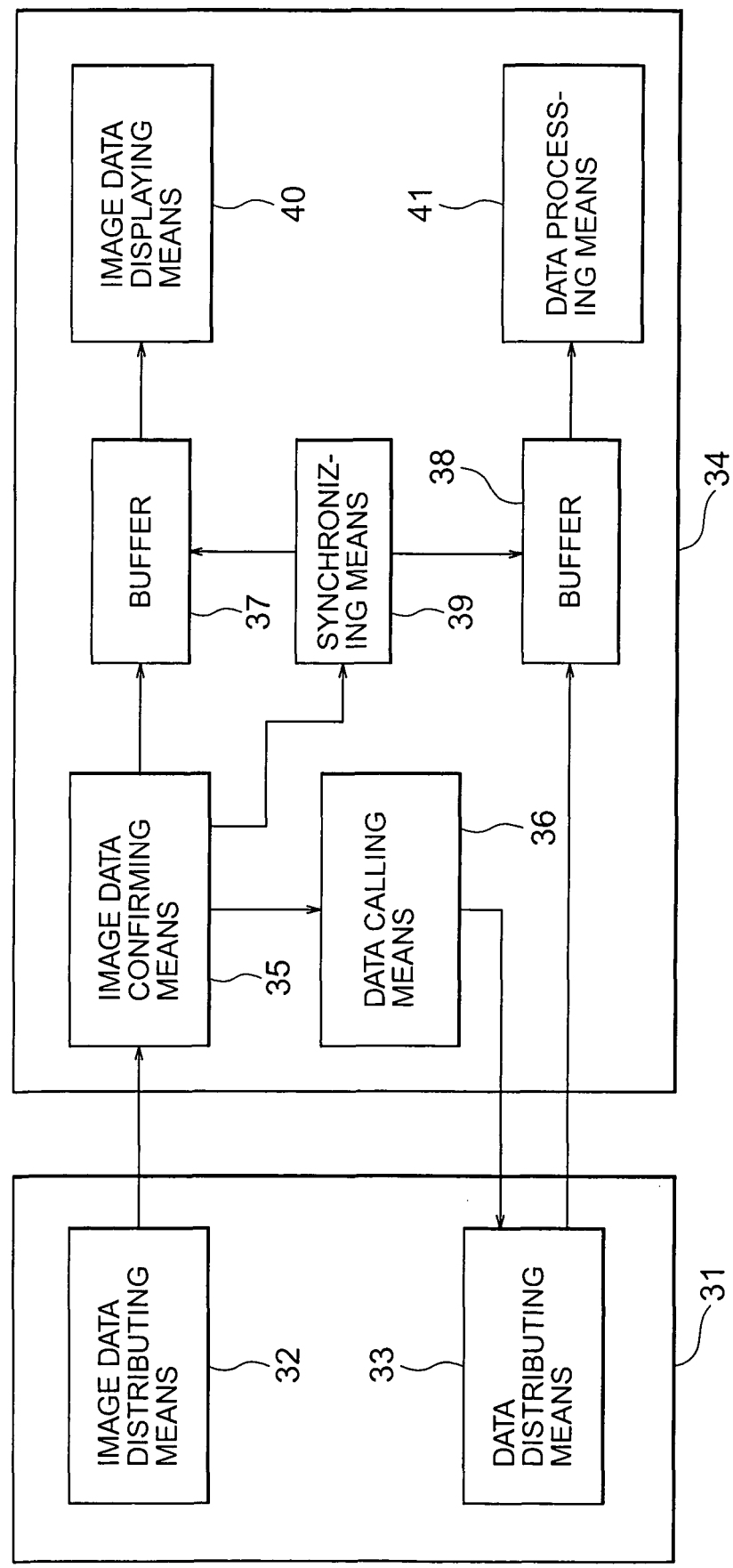
FIG. 10 is a processing block diagram of a conventional digital broadcasting transmission apparatus and a digital broadcasting reception apparatus disclosed in JP 2001-136496 A.

FIG. 7 shows a procedure of synchronously reproducing the contents in this reproduction mode (2).

When the processing starts upon reproduction operation by a user for example, at step 100, each content receiving section 50 synchronously reproduces the contents being received by referring to the timing information for the contents being received. At the next step 110, each content receiving section 50 retrieves the storage section 15*r* for the stored contents which are related to, that is, which are to be synchronously reproduced with the contents being received by referring to the content property information such as related content ID (see FIG. 3).

At the next step 120, for the decoding time DTS(t) obtained from the contents being synchronously reproduced, the layered content combining and reproducing section 52 detects, for each stored content obtained by the above retrieval, a unit (for example, an image frame or object for an image, and a voice processing frame for voice) having DTS(Ti) which satisfies DTS(t)+K−L(i)/2≦DTS(Ti)<DTS(t)+K+L(i)/2, on the basis of the reproduction control signal 202 from the synchronous reproduction control section 52. Here, K represents a lookahead time for detecting DTS(Ti) in advance, and L(i), the duration per unit of the content being synchronously reproduced.

At the next step 130, for all of the stored contents retrieved at step 110, it is determined whether or not the detection at step 120 was successful. If at least one of the detections at step 120 for all of the stored contents retrieved at step 110 was not successful (step 130, "No"), then at the next step 140, the decoding is started according to the decoding time DTS(Ti) for any stored contents which were successful in the unit detection at step 120 to synchronously reproduce the contents with the contents being received. On the other hand, the stored contents which failed in the unit detection are again subjected to the processing of steps 120 and 130.

On the contrary, if the detection at step 120 for all of the stored contents retrieved at step 110 was successful (step 130, "Yes"), then at the next step 150, the decoding of the stored contents which were successful in the unit detection at step 120 is started according to the decoding time DTS(Ti) to synchronously reproduce them with the contents being received. In this way, all of the stored contents retrieved at step 110 will be synchronously reproduced with the contents being received in the synchronous reproduction of either step 140 or 150. Note that in the case of a simple reception apparatus without synchronous reproduction capability, pseudo synchronous reproduction solely from the start point of the content is performed by referring to the reproduction start timing information included in the timing information 102 of the contents to be received and of the related stored contents. Further, in the case of a simple reception apparatus without content combination capability, synchronous reproduction is performed without referring to the combination timing information, and by referring to the decoding timing information, the presentation timing information and the reproduction start timing information included in the timing information 102.

Finally, the mode (3) of combining and reproducing the transmission bit sequences received on respective transmission channels after being temporarily stored will be described. In this mode of reproduction, if a content to be reproduced is specified among the stored contents, then contents related to the content specified for reproduction are detected by referring to the content property information such as related content ID (see FIG. 3) for the stored contents, and the decoding, combining, and synchronous reproducing are performed on the basis of the timing information assigned to each content. In the case of a simple reception apparatus without synchronous reproduction capability, pseudo synchronous reproduction solely from the start point of the content is performed. Further, in the case of a simple reception apparatus without content combination capability, synchronous reproduction is performed without referring to the combination timing information, and by referring to the decoding timing information, the presentation timing information, and the reproduction start timing information included in the timing information 102.

Now, the content reception managing section 53 is notified via a content reception control signal 202 of each processing status in the reception processing section 21, the descrambling section 22, and the demultiplexing section 23 constituting the content receiving section 50, the synchronous reproduction control section 51, the layered content combining and reproducing section 52, and the storage section 15r. On the basis of the processing status of which each of these sections notifies, the content reception managing section 53 controls via the content reception control signal 202 each processing in the reception processing section 21, the descrambling section 22, the demultiplexing section 23, the synchronous reproduction control section 51, the layered content combining and reproducing section 52, and the storage section 15r. In addition, the content reception managing section 53 uses a request/notification signal 107 for requesting, via a communication line from transmission apparatus side such as the digital broadcasting transmission apparatus shown in FIG. 1, to transmit a program broadcasting schedule, to transmit a list of contents which can be distributed on demand and their content property information, and to distribute contents on a selected transmission channel and at a selected time, or for giving notice of transmission delay information for a broadcast content transmitted on each transmission channel, and a transmission channel quality. As the transmission delay information, clock information in the timing information incoming on respective transmission channels is compared with each other to detect the difference of transmission delay times between the transmission channels, and then the result of detection is notified. Further, the transmission channel quality is based on a result of error correction in the reception processing section 21 of each content receiving section 50.

In addition, in the layered content combining and reproducing section 52 of the digital broadcasting reception apparatus described above, the decoders in each decoder section 61a, . . . , and 61n are fixedly assigned to each transmission channel. However, if there is an unused decoder in a decoder section 61, this decoder section 61 may use the content reception control signal 202 to notify the content reception managing section 53 of having an unused decoder. The content reception managing section 53 can then determine decoders to be used for each transmission channel, and notify the layered content combining and reproducing section 52 of the decoder assignment information via the content reception control signal 202. Thus the decoders to be used can be shared among the transmission channels without changing the structure shown in FIG. 6. The decoders can therefore be effectively utilized, and as a result, the size of the apparatus can be reduced.

As described above, according to the digital broadcasting transmission apparatus of this embodiment, a part of contents layered according to importance level, quality, and error tolerance level is transmitted on different transmission channels. Therefore various contents can be transmitted with high quality and great reality without being restricted by the transmission bandwidth.

On the other hand, on the side of the digital broadcasting reception apparatus of this embodiment, various contents can be received, a part of which layered according to importance level, quality, and error tolerance level are transmitted on different transmission channels, to achieve combined reproduction and synchronous reproduction based on the timing information. That is, contents can be watched or listened not only by means of a sophisticated reception apparatus which combines and reproduces all the layered contents transmitted on different channels based on information such as the combination timing information, but also by means of a simple reception apparatus which receives and reproduces only contents of a basic underlying layer without referring to the combination timing information, or a simple reception apparatus which has no synchronous reproduction capability based on the decoding timing information and the presentation timing information. It is therefore possible to meet various forms of service such as mobile reception by a car-mounted terminal and reception by a mobile terminal as well as an ordinary mode of reception.

Further, when the layered contents are divided and transmitted on a plurality of transmission channels, layered contents having a higher importance level may be transmitted on transmission channels having relatively small transmission error rates, and layered contents having a lower importance level may be transmitted on transmission channels having relatively large transmission error rates. Then, on the side of the digital broadcasting reception apparatus, a plurality of contents transmitted via a plurality of transmission channels can be combined and reproduced, thereby effectively utilizing transmission channels, and reducing the effect of quality deterioration due to transmission path errors.

Furthermore, this digital broadcasting reception apparatus is capable of combined reproduction of the stored contents, combined reproduction and synchronous reproduction of the stored contents and the contents being received in real time, and synchronous reproduction of real-time contents incoming on different transmission channels. This enables watching or listening of such contents with high quality and great reality that could not be transmitted on ordinary transmission channels due to the restricted transmission bandwidth.

In addition, the conventional mode of broadcasting can provide at most a bilingual broadcast. In the digital broadcasting apparatus of the present invention, however, the contents which have been transmitted using a plurality of transmission channels can be synchronously reproduced. Therefore a multilingual broadcasting service can be enjoyed by transmitting an image content and a main voice on an ordinary transmission channel, and subvoices on different transmission channels, thereby enabling an image and any voice to be received and watched/listened.

As described above, according to this invention, from the transmitting side, a part of contents layered according to importance level, quality, and error tolerance level is transmitted on different transmission channels. Therefore various contents can be transmitted with high quality and great reality without being restricted by the transmission bandwidth. On the other hand, on the receiving side, contents can be watched or listened not only by means of a sophisticated reception apparatus which combines and synchronously reproduces all the layered contents, but also by means of a simple reception apparatus which receives and reproduces contents of only a basic underlying layer. It is therefore possible to meet various forms of service such as mobile reception by a car-mounted terminal and reception by a mobile terminal as well as an ordinary mode of reception.

Further, when the layered contents are divided and transmitted on a plurality of transmission channels, layered contents having a higher importance level may be transmitted on transmission channels having relatively small transmission error rates, and layered contents having a lower importance level may be transmitted on transmission channels having relatively large transmission error rates. Then, the contents can be combined and reproduced on the receiving side, thereby effectively utilizing transmission channels, and reducing the effect of quality deterioration due to transmission path errors.

Furthermore, the reception apparatus is capable of combined reproduction of the stored contents, combined reproduction and synchronous reproduction of the stored contents and the contents being received in real time, and synchronous reproduction of real-time contents incoming on different transmission channels. This enables watching or listening of such contents with high quality and great reality that could not be transmitted on ordinary transmission channels due to the restricted transmission bandwidth.

In addition, the conventional mode of broadcasting can provide at most a bilingual broadcast. In the present invention, however, the contents which have been transmitted using a plurality of transmission channels can be synchronously reproduced. Therefore a multilingual broadcasting service can be enjoyed by transmitting an image content and a main voice on an ordinary transmission channel, and subvoices on different transmission channels, thereby enabling an image and any voice to be received and watched/listened.

The invention claimed is:

1. A digital broadcasting transmission apparatus comprising:
   a timing information generating unit for providing timing information indicating processing timing of received content on a reception apparatus side, wherein the timing information includes: decoding timing information, combination timing information, and presentation timing information for the contents and clock information providing a time scale for each of the decoding, combination, and presentation timing information generated in the timing information generating unit; and
   a content transmission unit for transmitting layered content and the timing information generated for the respective layered content over a plurality of transmission channels,
   wherein the content transmission unit allocates a transmission channel to each layer of the layered content, the layered content constituting one program; and
   wherein the combination timing information indicates the timing of combining each layer of content received over a separate transmission channel.

2. A digital broadcasting transmission apparatus according to claim 1, wherein the content transmission unit transmits a part of the layered content constituting one program with the timing information generated for the respective part of the layered content over different transmission channels, before a program broadcast or after a program broadcast.

3. A digital broadcasting transmission apparatus according to claim 1, wherein the timing information generating unit generates, as the timing information, combination timing information indicating combination timing for processing units of content divided into a plurality of objects or processing units of layered content.

4. A digital broadcasting transmission apparatus according to claim 1, wherein the content transmission unit allocates a transmission channel to each layer of content based on a degree of congestion of the plurality of transmission channels.

5. A digital broadcasting transmission apparatus according to claim 1, when the content transmission means allocates a transmission channel to each layer of content, the content transmission means compensates for a difference of transmission delay between respective transmission channels to provide transmission.

6. A digital broadcasting transmission apparatus according to claim 5, wherein the content transmission unit compensates for a difference of transmission delay between respective transmission channels based on transmission delay information notified from a receiving side.

7. A digital broadcasting transmission method comprising:
   generating timing information indicating processing timing of received content on a reception apparatus side, wherein the timing information includes: decoding timing information, combination timing information, and presentation timing information for the contents and clock information providing a time scale for each of the decoding, combination, and presentation timing information;
   allocating, using a processor, a transmission channel to each layer of layered content, the layered content constituting one program; and
   transmitting each layer with the timing information generated for the respective layer of content before a program broadcast or after a program broadcast,
   wherein the combination timing information indicates the timing of combining each layer of content received over a separate transmission channel.

8. A digital broadcasting reception apparatus comprising:
   a content receiving unit for receiving layered content transmitted over one or more transmission channels and timing information indicating processing timing at which the received layers should be processed, wherein the timing information includes: decoding timing information, combination timing information and presentation timing information for the contents and clock information providing a time scale for each of the decoding, combination, and presentation timing information;
   a content reproducing unit for reproducing the layered content; and
   a synchronous reproduction control unit for providing control to reproduce content constituting one program while establishing synchronization between the received layers of content by referring to the timing information;
   wherein the combination timing information indicates the timing of combining each layer of content received over a separate transmission channel.

9. A digital broadcasting reception apparatus according to claim 8, further comprising:
   a storage unit for storing the received layers of content; and
   wherein the synchronous reproduction control unit provides control to detect content related to the layered content being received among the content stored in the storage unit and to reproduce the content while establishing synchronization between the received content and associated stored content by referring to the timing information.

10. A digital broadcasting reception apparatus according to claim 8, further comprising a content reception managing unit for requesting transmission of content and information related to the content.

11. A digital broadcasting reception apparatus according to claim 10, wherein when the content receiving unit receives the timing information transmitted via a plurality of transmission channels, the content reception managing unit detects a transmission delay time for each transmission channel or a difference of transmission delay times between the transmission channels and notifies the detected result to a transmitting side as transmission delay information.

12. A digital broadcasting reception method comprising:
   receiving, over one or more transmission channels, layers of content along with associated timing information indicating processing timing for the received layers, the timing information including decoding timing information, combination timing information, presentation timing information and clock information providing a time scale for each of the decoding, combination, and presentation timing information;

providing, using a processor, control signals for reproducing layered content while establishing synchronization between the layers of content by referring to the timing information;

reproducing, using a processor, the layered content based on received layers, timing information, and control signals, wherein the combination timing information indicates the timing of combining each layer of content received over a separate transmission channel.

13. A digital broadcasting transmission apparatus according to claim 1, wherein the timing information further includes reproduction start timing information.

14. A digital broadcasting transmission method according to claim 7, wherein the timing information further includes reproduction start timing information.

15. A digital broadcasting reception apparatus according to claim. 8, wherein the timing information further includes reproduction start timing information.

16. A digital broadcasting reception method according to claim 12, wherein the timing information further includes reproduction start timing information.

* * * * *